US012497571B2

(12) United States Patent
Bitar

(10) Patent No.: US 12,497,571 B2
(45) Date of Patent: Dec. 16, 2025

(54) METHOD FOR CONTINUOUS EXTRACTION OF EXTRA-VIRGIN ARGAN OIL FOR MULTIPLE USES

(71) Applicant: IRIS COSMETOLOGIE, Marrakesh (MA)

(72) Inventor: Khalid Bitar, Marrakesh (MA)

(73) Assignee: IRIS COSMETOLOGIE, Marrakesh (MA)

( * ) Notice: Subject to any disclaimer, the term of this patent is extended or adjusted under 35 U.S.C. 154(b) by 818 days.

(21) Appl. No.: 17/770,951

(22) PCT Filed: Nov. 27, 2020

(86) PCT No.: PCT/MA2020/000015
§ 371 (c)(1),
(2) Date: Oct. 10, 2022

(87) PCT Pub. No.: WO2021/080405
PCT Pub. Date: Apr. 29, 2021

(65) Prior Publication Data
US 2024/0132800 A1    Apr. 25, 2024
US 2024/0228907 A9    Jul. 11, 2024

(30) Foreign Application Priority Data

Oct. 21, 2019   (MA) .......................... 47244

(51) Int. Cl.
| | |
|---|---|
| *C11B 1/06* | (2006.01) |
| *A23D 9/04* | (2006.01) |
| *A61K 8/92* | (2006.01) |
| *A61Q 19/00* | (2006.01) |
| *C11B 1/04* | (2006.01) |
| *C11B 3/00* | (2006.01) |

(52) U.S. Cl.
CPC .................. *C11B 1/06* (2013.01); *A23D 9/04* (2013.01); *A61K 8/922* (2013.01); *A61Q 19/00* (2013.01); *C11B 1/04* (2013.01); *C11B 3/008* (2013.01)

(58) Field of Classification Search
None
See application file for complete search history.

(56) References Cited

FOREIGN PATENT DOCUMENTS

CN     107650414 A    2/2018

OTHER PUBLICATIONS

Kartah, B. E., et al., Effect of filtration on virgin argan oil: Quality and Stability, J. Mater. Environ. Sci., 6 (2015) pp. 2871-2877. (Year: 2015).*

(Continued)

*Primary Examiner* — Dominic Lazaro
(74) *Attorney, Agent, or Firm* — Haynes and Boone, LLP

(57) ABSTRACT

The present invention relates to a method and a set of devices installed in series in a linked manner for the extraction of extra-virgin argan oil from argan fruit, and of other oleaginous (Barbary fig seed, grapeseed, almond walnut, avocado, cherry, sunflower seed, avocado, etc.) oils, making it possible to reduce the production time while guaranteeing the quality level of the product and a better yield. These oils have various uses and applications: food, cosmetic and therapeutic oils. The invention makes it possible to obtain a quality extra-virgin argan oil without chemical transformation and destruction.

19 Claims, 2 Drawing Sheets

Scheme of extraction process of Argan and oleaginous oils

(56) References Cited

OTHER PUBLICATIONS

Badr Eddine et al., "Effect of filtration on virgin argan oil: Quality and Stability", *Environ. Sci.*, Jan. 1, 2015, pp. 2871-2877.
Charrouf Zoubida et al., "Should the Amazigh Diet (Regular and Moderate Argan-Oil Consumption) have a Beneficial Impact on Human Health?", *Critical Reviews in Food Science and Nutrition*, vol. 50, No. 5, Apr. 5, 2010, pp. 473-477.
Hilali Miloudi et al., "Influence of Origin and Extraction Method on Argan Oil Physico-Chemical Characteristics and Composition", *Journal of Agricultural and Food Chemistry*, vol. 53, No. 6, Mar. 1, 2005, pp. 2081-2087.

* cited by examiner

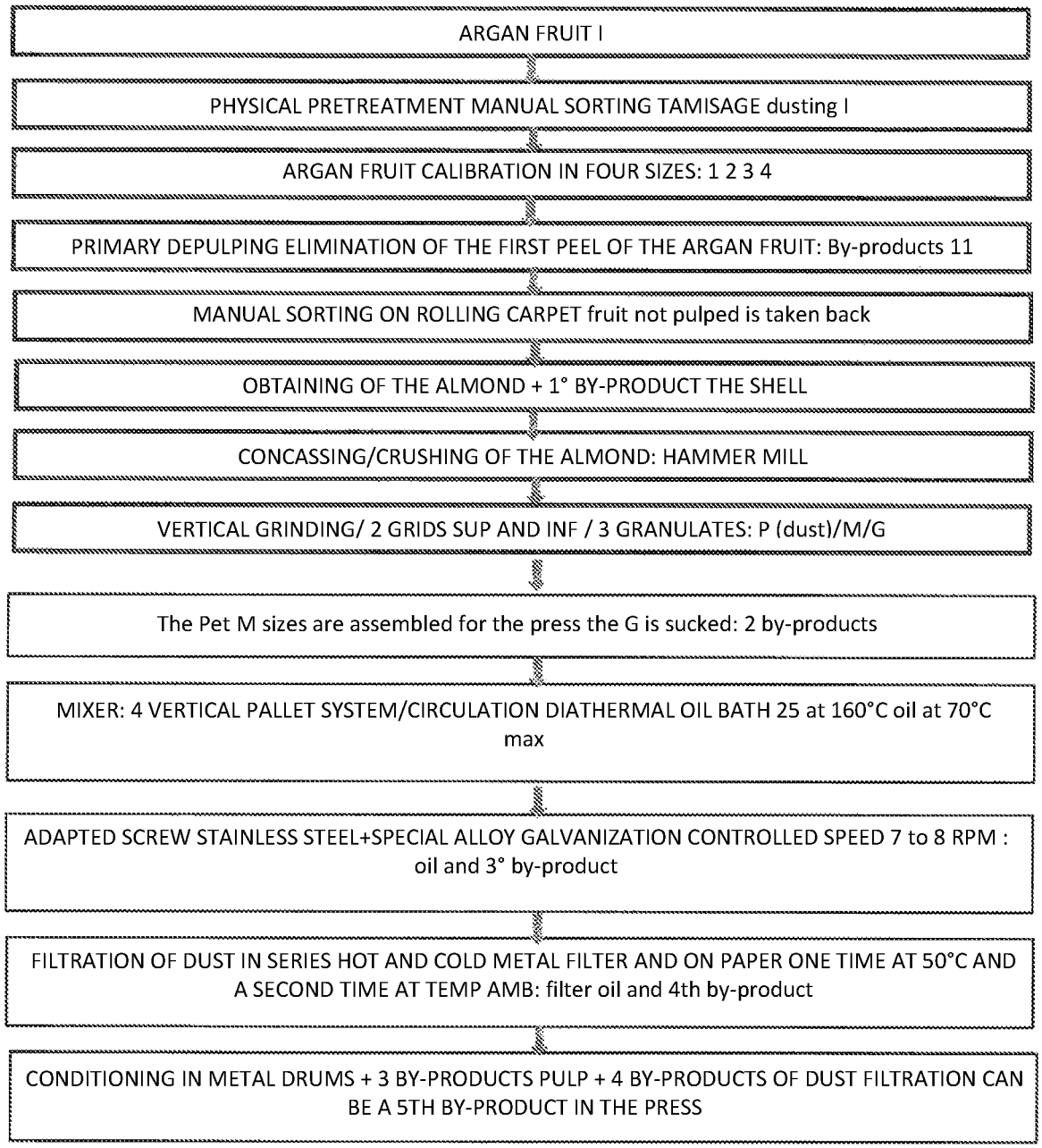
FIG. 1: Scheme of extraction process of Argan and oleaginous oils

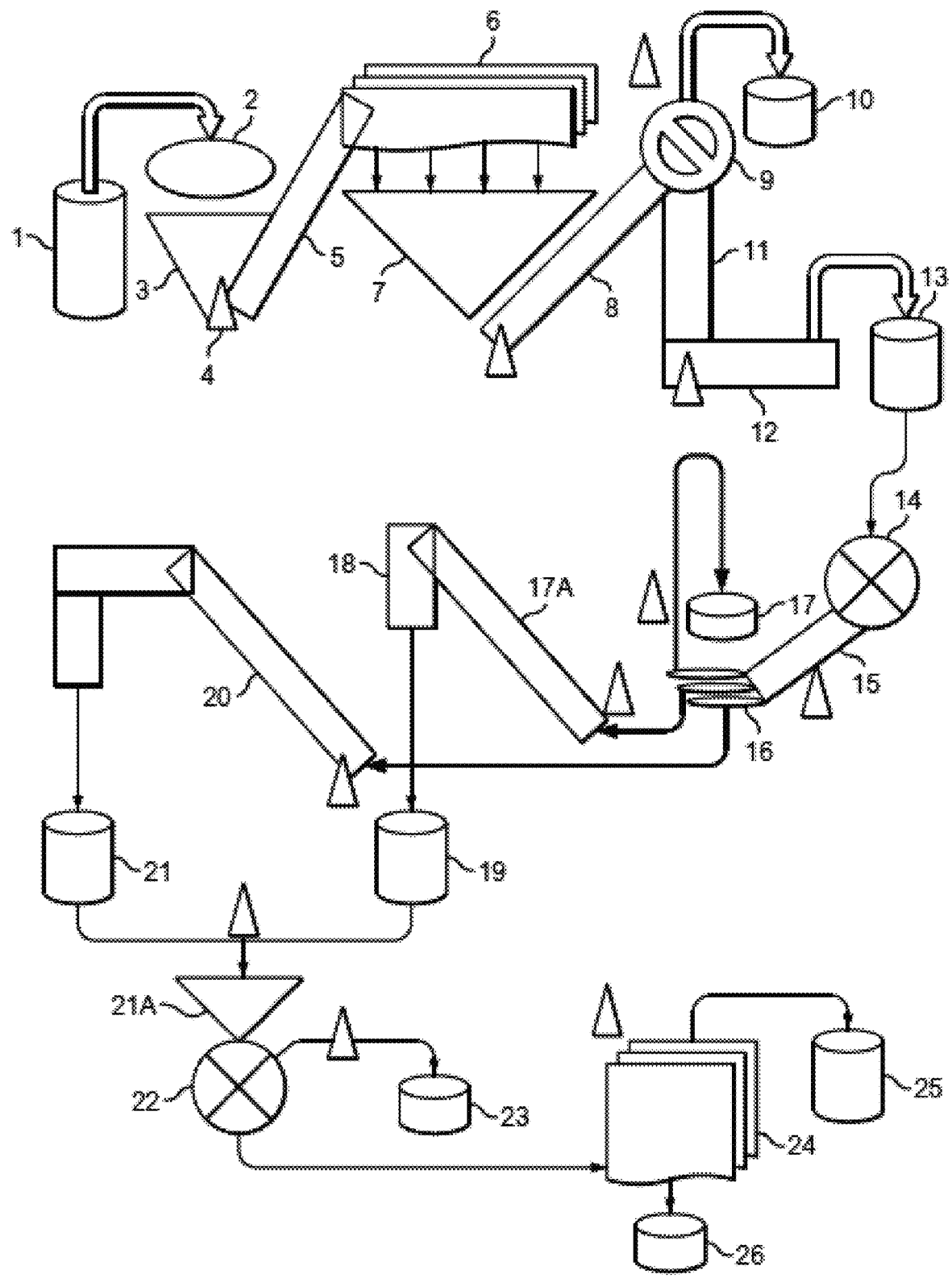
FIG. 2: SCHEME OF PROCESS AND EQUIPMENT FOR THE EXTRACTION OF ARGAN AND OLEAGINOUS OILS

METHOD FOR CONTINUOUS EXTRACTION OF EXTRA-VIRGIN ARGAN OIL FOR MULTIPLE USES

CROSS-REFERENCE TO RELATED APPLICATION

This application claims priority to PCT International Application No. PCT/MA2020/000015, filed Nov. 27, 2020, which PCT claims the benefit of Moroccan Patent Application No. 47244, filed on Oct. 21, 2019, the entire contents of each of which is hereby incorporated herein in its entirety by express reference thereto.

TECHNICAL FIELD

The Moroccan Argan oil cultivated in the regions of Essaouira and Agadir is unique in the world and therefore its total quality (nutritional, bio-therapeutic, nutraceutical, cosmetic, food) must be preserved scrupulously. The proposed extraction process is non-destructive, cold and without the use of water or additives. The invention is essentially based on the innovative purely physical cold extraction process, as well as its production facility in the food and cosmetic industry.

The technical field of this invention concerns the processes and plants for the production of the oils: Argan, olive, walnut, avocado, apricot: almond, date, and others.

The destination and applications of these oils are diversified: food, cosmetic and natural medication oils.

The invention allows to obtain an extra virgin Argan oil of quality and without destruction and chemical transformation.

The advantage of the present invention is that the obtained oils keep all their organoleptic characteristics: color, smell, taste. and that the plant works continuously in a non energy consuming way and according to an optimized process.

TECHNICAL STATE

The facilities and processes for the extraction of Argan oil are traditional in Morocco, country of Argan oil. On a global scale, innovations in this direction are rare. The patent documents below disclose processes and installations for extracting oil (not Argan oil) with a process and installation different from the present invention.

Document WO2012011883A1 discloses a continuous process for producing olive oil in a continuous chain with a continuous screw press and hot and cold pressing.

Document CN109468 67A discloses an oil extraction process comprising a primary screening machine, a winnowing machine, a hulling machine, a dehulling machine, a calibrated screening machine, a pulverizer and a press arranged in sequence, and a bleaching tank, a plate and frame filter press, a fine filter, a deodorisation tank and a filling machine arranged in sequence.

BRIEF DESCRIPTION OF THE DRAWINGS

For a more complete understanding of the principles disclosed herein, and the advantages thereof, reference is now made to the following descriptions taken in conjunction with the accompanying drawings, in which:

FIG. 1 is a flowchart for extracting Argan and oleaginous oils, in accordance with various embodiments.

FIG. 2 is a block diagram of an Argan and oleaginous oil extraction system, in accordance with various embodiments.

TECHNICAL DESCRIPTION

The invention concerns a continuous process of transformation of the raw material. FIG. 1 is a flowchart of a process 100 for extracting Argan and oleaginous oils in accordance with various embodiments. Argan fruit, which passes through several stages until the finished product extra virgin Argan oil. The process is articulated around two parts: production of almonds or kernels and the controlled mechanical press. Each part is modulated in several modules: sieving, grading, pulping, crushing, press, filtration, storage.

The total process is continuous and articulated in three stages: A. B and C:
Step 1 (A): preparation of almonds
Step 2 (B): obtaining the almond powder
Step 3 (C): obtaining the oil
Each step is articulated around several modules:
Step A is composed of:
  1. Weighing the raw material and sieving A1
  2. Colibration: A2
  3. Depulping: A3
  4. Sorting/checking: A4
Step B:
  1. Crushing (B1)
  2. Sieving (B2)
  3. Dusting (B3)
Stage C:
  1. Mixer (C1)
  2. Press feeding (C2)
  3. Press (C3)
  4. D6cantation of the oil (C4)
  5. Oil pumping (CS)
  6. Filtration 1 (C6)
  7. Filtration 2 (C7)
  8. Oil pumping and storage (C8)

A: (Receiving/Sorting): The raw material (1) is processed freshly without any treatment or dehydration. The conditions of the process are variable and depend on the humidity level which varies from 8 to 15%. Therefore, the speed. power of the motors, frequency flow, voltage and power consumption in energy are readjusted according to the quality of fruits, which are arranged in order to control the extraction rate and the losses. The fruits are sorted by visual and manual control then by a sieve (2) to eliminate dust and foreign bodies.

B: (grading station): After sorting and sifting, the fruit is driven for grading by a screw oriented at an angle of 45° to the ground. The fruits are placed in a hopper (3) and then channeled (5) with a 380 V motor and a power of 3 KW (4) to be calibrated (6) pushed with power of 22 KW. Four calibers are obtained according to the size and thickness of the fruit to be conveyed separately to the pulping machine.

C: (Pulping station): The fruit is driven by a motor with a power of 1.5 KW to the pulping station (9). The pulping (removal of the pulp or shell). A system based on centrifugal forces applied by paddles that rotate horizontally at high speed with a relatively low power of 0.7 kW. The fruit, according to its dimensions and size, is ejected or propelled by a speed and a relative proportional force on the metal wall that causes the breaking of the shell. The shell is sucked by a pump of 1.5 KW to the storage (10). The kernel is driven vertically by gravity (11) and then undergoes a double vibration by two motors of 5.5 KW power.

D: (Quality control of pulping): The kernel is driven on a belt (12) of visual and manual control by a motor of power of 0.75. The almonds are stored (13). The overheating is absent and controlled. Therefore the almond is tempered and not hot.

E: (Crushing): The most important step is the crushing. This stage of crushing where the kernel undergoes a bludgeoning by a system of blows by hammers (14) and pushed by a motor 0.55 KW (15) and a motor mill of 18.5 KW.

F: (sieving): The crushed material is sieved into 3 aggregates by 2 sieves (16). The finest fraction is the one with the highest oil content (21) and is driven by a 0.55 KW motor. The medium fraction is recovered and mixed with the finest fraction (21). The large fraction is driven to be separated into two fractions (17). The separation is carried out with an ejection system with a power of 0.55 KW (18).

G: (refining or dusting): At this station, we recover the small light fractions on the one hand and the by-products or waste on the other hand. The fine fraction called dust is very rich in oil (19). The other fraction corresponds to large particles poor in oil, corresponds to a by-product which is the shell of the almond or peel. The fractions rich in oil are transferred and carried to the press room.

H: (mixer): the fractions (19) and (21) are mixed in a mixer (21) with a capacity of about 455 kg and a power of 5.55 KW. It is connected to the press for feeding by a pneumatic piping system. It is equipped with a brake in order not to create a desynchronization with the press.

1: (Press feeding): the press is articulated with the automatic wagon mixer. It is self-regulated for accurate supply rate. The feeding of the raw material is controlled: quantity, humidity and granulometry. It gives the signal to the mixer to feed the crushed material. An auger (22) is custom made for this process. It rotates at a controlled frequency of 7.5 rpm and a power of 65 KW. By-products, the oil cakes, which are ejected horizontally and then propelled from a tank to a storage container (23).

11: (the press): The most important system of the process. It is under physical. The temperature is regulated and controlled, cold and hot according to the cosmetic or food needs, and this by a system of 4 plates mounted vertically. The control of pump motors, power, frequency and energy.

12: Press screw: The screw is made of galvanized steel and enamel with a special alloy.

J: pre-filtration: The oil is collected vertically under the slots of the horizontal screw filtered through a stainless steel filter. It is then decanted. The supernatant is pumped by two pumps of 1 KW and 3 KW through stainless steel pipes to the filtration (24). The solid deposit is a by-product that is valorized in cosmetics.

K: Oil pumping (24): The oil is pumped and channeled with a relatively low power at 0.3 kW to the filtration area.

L: Filtration 1: The oil undergoes two series of filtration hot at 40° C. and cold with an engine power of 1.5 KW. The first filtration through stainless steel strainers.

M: Filtration 2: The second through bio-cellulose filters (25). Another sub solid waste product is recovered for cosmetic use (27).

N: (Pumping and storage): The oil is recovered by pumping with a power of 1 KW in b-tanks (26).

TECHNICAL ASPECTS

Description of the technical components of the equipment of each station

A: RECEPTION/TAMING STATION
  1 Electric motor
  2—Dimmer
  3—Reducer
  4—Front support
  5—Reansupport
  6—Drive sprocket
  7—Metal chain
  8—Return sprocket B: CALIBRATION STATION
  1—Electric motor
  2—Reducer
  3—Mould of the cup
  4—Seeger for outdoor use
  5—Outdoor regulation station
  6—Loading hopper
  7—Sieve 15
  8—Sieve 15.5
  8A—Sieve 17
  9—Sieve 17.5
  9A—
  10—Screen 18.5
  11—Sieve 19
  11A—Ring bushing
  12—Cylinders
  13—Transmission support
  14—Loading hopper 1
  15—Loading hopper 2
  16—Loading beam 3
  17—Loading beam 4
  18—Elastic spine
  19—Loading support
  20—Window
  21—Spherical roller
  22. Cleaning roller C: DEPULPING
  1—Electric motor kW 7.5 4P B3 400V 50 Hz
  2—Ball thrust oil seal
  3—Spherical roller
  4—Drive pulley
  5—Bearing support
  6—Ring and rosette
  7—Belt: cross SPA 1800
  8—Transmission pulley
  9—Anti-vibration feet
  10—Level indicator
  11—Belt seals
  12—Double paddle wheel
  13—Polyethylene anti-wear ring
  14—Cyclone seal
  15—Cyclone resistance or anti-wear sheet
  16—Rotating wave conveyor
  17—Rotating wave seal
  18—Rotating wave
  19—Double version hopper
  20—Small handwheel of the hopper adjustment D: Control of the Quality of DEPULPING
  1—Conveyor belt driven by a motor of 0.75 KW
  2—10 persons visually control the pulping quality
  3—Baskets of recuperation
E: CRUSHING
  1 Electric Motor/KW 1.5 4P B3 400V-40 Hz
  2—Transmission Torque
  3—FRB Ring
  4—Support
  5—Rotary Hammer
  6—Hammer Space
  7—Hammer Rotation Round
  9—Screw
  10—Rosette
  11—Perforated Mesh Diameter 8/10/12
  12—Filter
F: TAMING
  1—Console of the machine
  2—Vibration motor
  3—Mesh diameter 10 mm
  4—Mesh diameter 4 mm
G: DUSTING
  1—Electric motor
  2—Variator
  3—Speed control wheel
  4—Transmission belt
  4A—Engine side compass
  5—Belt
  6—Support
  7—Shaft side pulley
  7A—Shaft compass
H: MIXER
  1—Electric motor/KW 5.5 4P 85-400V-50 Hz
  2—Parallel axis gearbox
  3—Dust seal
  4—Filter
  5—Traction compass
  6—Ball bushings
  7—FRB bushings
  8—Shaft side pulley
  9—Shaft side compass
  10—Mixer shovel
  11—Opposite mixing arms
1: POWER SUPPLY OF THE PRESS
  1 Electric motor KW 5.5 4P 85-400V-50 Hz
  2 Parallel axis scraper
  3 Gasket for dust removal
  4 Filter
  5 Traction compass
  6 Ball bushings
  7 FRB bushings
  8 Shaft side pulley
  9 Shaft side compass
  10 Mixer shovel
  11 Opposite mixing arms
11: THE PRESS
  1—Electric motor
  2—Reducer
  3—Agitator shaft
  4—Agitator shovel
  5—Support with bronze ring
  6—Adjustment door
  7—Indicator vane
  8—Electromechanical limiter
  9—Gear motor and variator
J: OIL DECANTATION
  Stainless steel collection and decantation tank
M: FILTRATION 2
  Serial filtration platform before conditioning Stainless steel filters
  Cellulose bio-polymer filters Stainless steel piping pumps
N: PUMPING/STORAGE
  Pump
  Food piping in bio-polymer Fut of 100 L

THE BENEFITS OF THE INVENTION

The process duration is optimal and relatively short, 4 hours compared to competitors' processes (more than 16 hours), for a raw material tone.
The process is continuous 24/24 367 d/367 d.
The maintenance is fast.
The organoleptic quality is better than other processes: Acidity is controlled and acceptable 0.3 mg of potash per 100 g of oil; the color is light yellow
The oil is very homogeneous and acceptable without suspension or deposit.
The smell is appreciated and without burning or suspicious volatile compounds
The extraction yield is 3.5 to 4%.
One ton of fruit produces 48% almond
52% of shell
The small and medium dust is 24% or 240 Kg
The mass of oil is 35 to 40 kg, i.e. a percentage of 4%.
The by-product of almond, the shell, is rich in fiber and very poor in oil, is used as an additive to promote the pressure of oil from the two fractions crushed in the screw.
According to the certified and accredited analyses by an international laboratory, the results found prove that the initial quality of the fruit has been preserved and that the process has little negative impact on the quality of the oil.
Below are the results of the main analyses:
Organoleptic Quality:
  The color is of a very pale yellow color limpid
  The odor does not present any characteristic neither of burning nor of combustion or "cramming"
  Lovibond red 7.4 0.10
  Lovibond blue <LOQ 0.10
  Lovibond neutral <LOQ 0.10
  Aocs red 6.5 0.10
  Aocs yellow 70.0 0.10
  Lovibond yellow 70.0 0.10
  TOTAL ACIDITY: 0.37+0.04 g/100 g (relative to oleic acid)
  Composition titratable acidity
  Butyric acid (C 4:0) nr. % 0.010 0.050
  Capronic acid (C 6:0) n.r. 0.010 0.050
  Heptanoic acid (C 7:0) n.r. 0.010 0.050
  Caprilic acid (C 8:0) n.r. 0.010 0.050
  Caprinic acid (C 10:0) n.r. 0.010 0.050
  Caproleic acid (C 10:1) nr. 0.010 0.050
  Laurolic acid (C 12:1) n.r. %0.010 0.050
  Tridecanoic acid (C 13:0) n.r. % 0.010 0.050
  Tridecenoic acid (C 13:1) n.r. %0.010 0.050
  Miristic acid (C 14:0) 0.16+0.04% 0.010 0.050
  Miristoleic acid (C 14:1) n.r.% 0.010 0.050
  Pentadecanoic acid (C 15:0) 0.07+0.04% 0.010 0.050
  Pentadecenoic acid (C 15:1) nr. %0.010 0.050
  Palmitic acid (C 16:0) 12.58+0.74% 0.010 0.050
  Palmitoleic acid (C 16:1) 0.09+0.04% 0.010 0.050
  Trans esadecenoic acid (C16:1 trans) n.r. 0.010 0.050
  Heptadecenoic acid (C 17:0) 0.15+0.04% 0.010 0.050
  Heptadecenoic acid (C 17:1) 0.06+0.04% 0.010 0.050

Stearic acid (C 18:0) 5.62+0.40% 0.010 0.050
Oleic acid (C 18:1) 44.84+1.28% 0.010 0.050
Elaidinic acid (C18:1 trans) tracce % 0.010 0.050
Linoleic acid (C 18:2) 35.40+1.09% 0.010 0.050
Linoleic acid (C18:2 trans) tracce %0 0.010 0.050
Linolenic acid (C18:3) 0.15+0.04% 0.010 0.050
Trans-octadecatrienoic acid (C18:3 garlic trans) n.r. 0 0.0100.050
Peanut acid (C 20:0) 0.42+0.05% 0.010 0.050
Eicosenoic acid (C 20:1) 0.30+0.04% 0.010 0.050
Beic acid (C 22:0) 0.19+0.04% 0.010 0.050
Erucic acid (C 22:1) n.r.%0 0.010 0.050
Lignoceric acid (C 24:0) n.r.% 0 0.010 0.050
Fatty acid poly insature maggiori di C 20 nr.% 0 0.010 0.050
Monounsaturated fatty acids 45.29+1.28% 0 0.010 0.050
Trans monounsaturated fatty acids n.r.% 0 0.010 0.050
Polyunsaturated fatty acids 35.55+1.09% 0 0.010 0.050
Trans polyunsaturated fatty acids n.r.% 0 0.010 0.050

Sterolic Composition
Met: REG CEE 2568/1991
Cholesterol 0.1 OJ, 0,3] % 0.10
Brassicasterol <LOQ % 0.10
24-methylene cholesterol <LOQ % 0.10
Campesterole 0.4+0.2% 0.10

Analytical Results
Campestanol 0.5+0.2% 0.10
Stigmasterole 0.2+0.1% 0 0.10
Delta-7-campesterol 1.1+0.3% 0.10
Delta-5,23-stigmastadienole 0.8+0.3%0.10
Cholerosterol 0.210.0.4] % 0.10
Beta-sitosterol <LOQ % 0.10
Sitostanol 0.7+0.3% 0.10
Delta-5-avenasterol 0.2+0.1% 0.10
Delta-7.9(11)-stigmastadienol 2.9+0.5% 0.10 Delta-5,24-stigmastadienol
1.2+0.3%0.10
Delta-7-stigmastenol <LOQ %0.10
Delta-7-avenasterol 3.5+0.5% 0.10
Total Sterol 2.008.2+302.2 mg/kg 10
TOCOFEROL/Met, according to ISO 9936:2011
Alfa-tocoferol 41+6 mg/kg 1.0
Beta-tocoferol <LOQ mg/kg 1.0
Delta-tocoferol 60+9 mg/kg 1.0
Gamma-tocoferol 505+77 mg/kg 1.0
Total tocoferol 606+78 mg/kg 1.0
INSAPONIFIABLE 0.60+0.09 g/100 g 0.010
VITAMINA 02 n.r. ug/kg 5.010 103.7/Met: MP 1570 rev 2
VITAMIN 03 nr. ug/kg 5.010 98.6/Met: MP 1570 rev—
CAROTENOID/Met: MP 2078 rev 2
Astaxanthin <LOQ mg/kg 0.30
Lutein <LOQ mg/kg 0.30
Zeaxantin <LOQ mg/kg 0.30
Cantaxantin <LOQ mg/kg 0.30
beta-apo-8'-carotenal (E160E)<LOQ mg/kg 0.30
Citranaxantin <LOQ mg/kg 0.30
Beta-apo-8'-carotenico-ethylester acid (E 160 f)<LOQ mg/kg 0.30
Total beta-carotene 0.34+0.20 mg/kg 0.30
Licopene <LOQ mg/kg 0.30
Unidentified xantophyl 1.26+−0.24 mg/kg 0.0
Total pigment HPLC 1.60+−0.31 mg/kg 0.30
Total pigment SPT 1.74+−0.22 mg/kg (horn beta-0.30 carotene)

Description of FIG. 2:

| | |
|---|---|
| 1: raw material | 18: ejection system |
| 2: sieve | 19: fine fraction |
| 3: quencher | 20: air separator |
| 4: motor | 21: finest fraction |
| 5: channel | 21A: mixer |
| 6: sizing | 22: screw |
| 7: quench | 23: storage contour |
| 8: channel | 24: cartridge filtration |
| 9: depuplage | 25: bio filtration cellulose pulping |
| 10: storage | 26: packaging |
| 13: storage | 27: solid residue |
| 14: conservation hammers | |
| 15: motor | |
| 16: two sieves | |
| 17: ash fraction | |
| 17A: medium fraction | |
| 11: motor vibrator | |
| 12: driving belt | |

What is claimed is:

1. A process for continuously extracting extra virgin Argan oil from a plurality of fruit, comprising the following steps:
   a. Reception/Screening, where raw material from the plurality of fruit is freshly processed without any treatment or dehydration and the process depends on a moisture level which varies from 8 to 15%, wherein a plurality of operating parameters including speed, power of motors, frequency, flow rate, voltage and energy consumption are adjusted according to quality of the fruit and wherein the fruit is weighed in order to control an extraction rate and to calculate losses and the fruit is sorted by a visual and manual control and then by a sieve to remove dust and foreign material;
   b. Calibration, where the fruit is placed in a hopper and then channeled through a motor to be calibrated;
   c. Depulping, where the fruit is led to a pulping zone which is based on centrifugal forces applied by paddles rotating horizontally at high speed, such that the fruit is ejected or propelled by a speed and a relative proportional force on a metal wall which causes shells of the fruit to break, following which the shells are sucked by a pump to a storage zone and kernels from the fruit are drawn by gravity vertically, then undergo a double vibration;
   d. Quality Control of the pulping, where the kernel is driven on a visual and manual control mat so that overheating is controlled and the kernel comes out tempered and not hot;
   e. Crushing, where the kernel is crushed into a crushed material by a system of blows by hammers;
   f. Sieving, where the crushed material is sifted into three different-sized granules, finest-size granules, medium-sized granules, and largest-sized granules, by two sieving machines, where the finest-sized granules are the granules highest in oil content and are conveyed by a motor, the medium-sized granules are collected to be mixed with the finest-sized granules, where the largest-sized granules are taken to be separated into finest-sized granules and medium-sized granules, where the separation is carried out with an ejection system;
   g. Refining or dusting, where small light granules and by-products or waste products are recovered, where a fine granule called dust is richest in oil and another granule is shells of peeled kernels, where the granules richest in oil are transferred to a press room;

h. Mixing, where the granules are mixed in a mixer connected to a press and fed by a pneumatic pipe system, equipped with a brake in order to not desynchronize with the press;

i. Press feeding, wherein the press is articulated with the mixer, which is self-regulated for a precise supply rate and wherein the feeding of the raw material is controlled for quantity, moisture and grain size, and the press gives a signal to the mixer to feed the material by rotating an auger at a controlled frequency, and further wherein by-products, called oilcakes, are ejected horizontally and then propelled from a bin to a storage container;

wherein the press comprises four vertically mounted plates and in which a temperature is regulated and controlled according to food or cosmetic needs via control of pump motors, power, frequency and energy;

wherein the press further comprises a press screw made of galvanized steel and enamel with an alloy;

j. Pre-filtration, wherein oil is collected vertically below slots of the press screw and is filtered through a filter, then decanted, and supernatant is pumped by two pumps through pipes to a filtration area;

k. Pumping of the oil, wherein the oil is pumped and channeled to the filtration area;

l. Filtration 1, wherein the oil undergoes two filtering steps in series, a first filtering step that is hot at 40° C. and a second filtering step that is cold;

m. Filtration 2, wherein the second filtering step passes through bio-cellulose filters; and n. Pumping and storage, where the oil is recovered by pumping into barrels.

2. The process according to claim 1, wherein the depulping includes removing the shell or the pulp from the fruit with a speed related to the size of the fruit by horizontal rotations of the paddles which propel the fruit on a metal plate in order to release the kernels, which is non-destructive and breaks and eliminates the shell without damaging the kernels.

3. The process according to claim 2, wherein the kernel is released in a descending manner, and the shell is ejected in an ascending manner, such that the kernels are then conveyed on a belt to facilitate manual visual inspection, wherein a vibration system is applied to the kernels as they fall, and wherein control of the quality of the pulping is visual and unpulped fruit will be reinjected to repeat the depulping step.

4. The process according to claim 3, wherein the peeled kernels are conveyed by a screw angled with respect to the ground over a height of about 3 meters.

5. The process according to claim 4, wherein the kernels are placed in a hopper which is driven by a screw angled at 45° to the ground, wherein the kernels are automatically fed into a hammer mill to be ground and crushed, wherein the temperature is controlled to avoid overheating of grindings, and further comprising a 0.2 mm mesh screen or mechanical filter to collect the largest-sized granules and feed them back into the mill.

6. The process according to claim 5, wherein the crushing of the kernels is carried out according to a maximum size that must not be exceeded and without overheating so as to obtain different-sized granules by passing the crushed material through a system of binary sieves to separate the finest-sized and largest-sized granules, wherein the finest-sized granules are the richest in Argan oil.

7. The process according to claim 6, wherein the largest-sized granules of the crushed material, which are low in oil, are used to recover dust by means of physical separation by a pumping system and fed by the screw, of the medium-sized granules and another larger-sized granule, evacuated vertically under gravity, which has the lowest content of oil.

8. The process according to claim 7, wherein dusts are collected from the finest-sized granules, and wherein the largest-sized granules are further processed and used as a natural carrier during the oil pressing of the other granules.

9. The process according to claim 8, wherein the finest-sized and medium-sized granules are transferred to the press via the mixer, and the largest-sized granules are used as a carrier facilitating quantitative pressing of the oils.

10. The process of claim 9, wherein only the finest-sized granules and medium-sized granules are pressed.

11. The process according to claim 10, wherein the finest-sized granules with a precise grain size of less than 0.2 mm are placed in a mixer.

12. An installation for the extraction of extra virgin Argan oil according to the process of claim 1 comprising:
   a reception and sieving station;
   a grading station;
   a pulping station;
   a control station;
   a crusher;
   a refining and dusting station;
   a mixer;
   a press;
   one or more filters; and
   a pumping and storage station,
   wherein the installation produces one or more oil-rich granules which are placed in the mixer, where said mixer is synchronized with the press by a hydraulic system.

13. The installation according to claim 12, wherein the flow of the press is dependent on the flow of the raw material of the kernel milling contained in the mixer, and wherein the pumping and storing station are operated in a synchronous manner to ensure a total press of the oils.

14. The installation according to claim 13, wherein the press screw consists of two materials, wherein the press screw has a body made of stainless steel, and the press screw has a special amalgam on its surface.

15. The installation according to claim 12, wherein variables of the press are constantly controlled, including quality, quantity, and temperature, depending on a purpose of the oil and its culinary or cosmetic use, by adjusting one or more of the four vertically mounted plates, viscosity of heating oil, speed of the press screw, pressure of the press, and wear of the special amalgam on the press screw's surface.

16. The installation according to claim 12, wherein a series of filters is provided through which the oil passes, including a post-press prefilter and a double filtration in series, which includes one cold filtration through stainless steel filters and a second filtration through a series of cellulose membranes.

17. The process of claim 1, wherein a solid deposit from the pre-filtration or filtration 2, or both, is a by-product adapted for use as a cosmetic.

18. A culinary product comprising extra virgin Argan oil formed by the process of claim 1.

19. A cosmetic comprising extra virgin Argan oil formed by the process of claim 1.

* * * * *